(12) United States Patent
Desclos et al.

(10) Patent No.: US 10,313,894 B1
(45) Date of Patent: Jun. 4, 2019

(54) BEAM STEERING TECHNIQUES FOR EXTERNAL ANTENNA CONFIGURATIONS

(71) Applicant: Ethertronics, Inc., San Diego, CA (US)

(72) Inventors: Laurent Desclos, San Diego, CA (US); Abhishek Singh, San Diego, CA (US); Jeffrey Shamblin, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 0 days.

(21) Appl. No.: 15/269,869

(22) Filed: Sep. 19, 2016

Related U.S. Application Data

(60) Provisional application No. 62/219,937, filed on Sep. 17, 2015.

(51) Int. Cl.
| | |
|---|---|
| *H04W 16/28* | (2009.01) |
| *H04B 7/06* | (2006.01) |
| *H04W 24/02* | (2009.01) |
| *H04W 88/08* | (2009.01) |
| *H04W 84/12* | (2009.01) |

(52) U.S. Cl.
CPC .......... *H04W 16/28* (2013.01); *H04B 7/0617* (2013.01); *H04W 24/02* (2013.01); *H04W 84/12* (2013.01); *H04W 88/08* (2013.01)

(58) Field of Classification Search
CPC ..... H04W 16/28; H04W 16/14; H04W 88/08; H04W 84/12; H04W 24/02; H04W 72/082; H04W 84/005; H04B 7/0617; H04B 7/0452; H04B 7/0626; H04B 7/0413; H04B 7/04; H04B 7/0608; H04B 17/318; H04B 7/0695; H04B 7/0408; H04B 7/0691; H04B 7/086; H04B 17/21
See application file for complete search history.

(56) References Cited

U.S. PATENT DOCUMENTS

| | | | |
|---|---|---|---|
| 5,515,059 A | 5/1996 | How et al. |
| 6,184,827 B1 | 2/2001 | Dendy et al. |
| 6,606,056 B2 | 8/2003 | Brogden |
| 6,646,599 B1 | 11/2003 | Apa et al. |
| 6,765,536 B2 | 7/2004 | Phillips et al. |
| 6,987,493 B2 | 1/2006 | Chen |

(Continued)

*Primary Examiner* — Ricardo H Castaneyra
(74) *Attorney, Agent, or Firm* — Dority & Manning, P.A.

(57) ABSTRACT

A beam steering antenna system for external antenna configurations for fixed and mobile communication devices is described where one or multiple beam steering antennas are integrated into a single external enclosure and where multiple enclosures containing beam steering antennas are used with a single communication device. Where multiple external enclosures are used with a single communication system such as a WLAN access point the beam steering antenna system provides an electrical means of optimizing antenna system and communication link performance as compared to mechanical means such as antenna enclosure positioning or orientation. Radiation mode selection for 2.4 GHz and 5 GHz antennas integrated into an external enclosure on a WLAN access point allows for independent optimization of the antenna systems for the two frequency bands without requiring antenna movement or positioning. If the antenna enclosures are movable or capable of rotation the beam steering antennas can be optimized for enclosure orientation.

14 Claims, 15 Drawing Sheets

(56) References Cited

U.S. PATENT DOCUMENTS

| | | |
|---|---|---|
| 7,068,234 B2 | 6/2006 | Sievenpiper |
| 7,215,289 B2 | 5/2007 | Harano |
| 7,911,402 B2 | 3/2011 | Rowson et al. |
| 8,126,417 B2 | 2/2012 | Saito |
| 8,362,962 B2 | 1/2013 | Rowson et al. |
| 8,446,318 B2 | 5/2013 | Ali et al. |
| 8,648,755 B2 | 2/2014 | Rowson et al. |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,263,798 B1 * | 2/2016 | Piazza .................. H01Q 3/446 |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,580 B2 | 9/2017 | Desclos et al. |
| 2014/0011460 A1 * | 1/2014 | Ali ..................... H01Q 1/243 |
| | | 455/75 |
| 2014/0329470 A1 * | 11/2014 | Chen ................ H04B 17/0085 |
| | | 455/67.7 |
| 2016/0380352 A1 * | 12/2016 | Liu ..................... H04W 16/28 |
| | | 342/359 |

* cited by examiner $$\text{Antenna Gain, } G \propto \frac{G_{fs}}{nD_1} \times \sin\frac{D_1}{\lambda}$$

$G_{fs}$ = antenna gain in free space $$Antenna\ Gain,\ G \propto \frac{G_{fs}}{nD_1} \times \sin\frac{D_1}{\lambda}$$

$G_{fs}$ antenna gain in free space

Modes sampled and eliminated from consideration based on system level characteristics

BEAM STEERING TECHNIQUES FOR EXTERNAL ANTENNA CONFIGURATIONS

CROSS-REFERENCE TO RELATED APPLICATIONS

This application claims benefit of priority with U.S. Provisional Ser. No. 62/219,937, filed Sep. 17, 2015; the contents of which are hereby incorporated by reference.

BACKGROUND

Field of the Invention

This invention relates generally to the field of wireless communication; and more particularly, to a beam steering antenna system and algorithm configured for external mounting functionality for use in a wireless local area network (WLAN) or cellular communication network.

Description of the Related Art

Wireless local area networks (WLANs) are common and present in buildings such as homes and businesses and in larger venues to include shopping centers, hospitals, airports, and outdoor settings. The performance and complexity of WLAN systems has continued to improve and increase, with this increase documented in industry standards IEE 802.11b, 802.11g, 802.11a, 802.11n, and more recently 802.11ac. With each successive standard the performance of the WLAN systems has improved and the complexity, such as the introduction of multi-input multi-output (MIMO) for the antenna system, has increased. Implementation of MIMO systems in communication networks requires that multiple antennas be used on one or both ends of the communication link (i.e.: transmit, and receive). Though antennas have been designed within commercial communication devices such as cell phones, laptops, tablets, and access points for quite some time (internal antennas), it is still common to design external antennas for the one or more antennas required for use in WLAN systems, such as an access point or "router", typically used in home and office buildings. The external antenna(s) can provide a more symmetrical radiation pattern and a radiation pattern that has a wider field of view around the device that the antenna is integrated within, especially when compared to an internal antenna. Better antenna efficiency can often be obtained from the external antenna due to greater separation distance between the antenna and the communication device. The external antenna can also be designed such that the antenna orientation or position can be changed by the end user to accommodate a specific location or device orientation. The external antenna(s) can also be positioned in an attempt to improve system level performance, such as throughput or communication range, but this can be a trial and error investigation that can be time consuming and difficult to perform. For consumer access points designed for use in homes the typical consumer that installs the access point in-home is not skilled or educated to the extent to have an understanding as to the effects of reflections and multi-path interferences encountered in building at radiofrequency (RF) frequencies, or how an antenna system can be altered, or adjusted, to improve throughput and connectivity.

Though external antennas can provide improved radiation pattern coverage as well as improved efficiency compared to volume limited internal antennas, the inability of an end-user to easily optimize or select the correct position or rotation angle of a movable external antenna remains a limitation. System level performance characterized by parameters such as data throughput and communication range are affected by the performance of single-input single-output (SISO) and multi-input multi-output (MIMO) antenna systems. When external antennas are implemented in a WLAN access point, the capability of moving the external antennas is provided to assist in improving the robustness of the access point as it is placed in a wide variety of rooms, buildings, and multi-path scenarios. Though passive antennas can be designed into an access point in an external configuration, such that the passive antennas can be adjusted in angle and/or separation between antennas, there is no easy method for the lay person to quickly determine optimal antenna positioning for the specific home or building that is being serviced by the access point. Measurements can be taken using a laptop or smartphone that is enabled with a Wi-Fi system and ability to connect to the access point, and throughput can be monitored at multiple locations, but this can be a time consuming process and can be above the capabilities of the typical consumer. Also with a changing environment such as furniture being moved, moving of the access point, or the frequency channel of operation being changed, the process of determining correct antenna positioning needs to be periodically repeated for optimal Wi-Fi system performance. There is a need for a better method of external antenna positioning and optimization.

Current and future WLAN access points, and client communication devices, will require higher performance from the antenna systems to improve system capacity and increase data rates. As new generations of handsets, gateways, and other wireless communication devices become embedded with more applications, and the need for bandwidth becomes greater, new antenna systems will be required to optimize link quality. The consumer communication industry is moving to higher orders of MIMO systems, with four by four MIMO systems now being designed into access points and video streaming devices for in-home connectivity. A four by four MIMO system requires a four antenna system designed into the access point or video streaming device, such that when external antennas are implemented, four separate antenna assemblies are required. As more external antennas are added to consumer devices, the overall device size grows, and starts to negatively impact the industrial design and aesthetics. Since antenna isolation needs to be maintained for proper system performance antenna separation requirements limit the ability to space antennas closer in an attempt to shrink the device size.

Commonly owned U.S. Pat. Nos. 9,240,634; 8,648,755; 8,362,962; and 7,911,402, each describe a beam steering technique wherein a single antenna is capable of generating multiple radiating modes; the contents of each of which is hereby incorporated by reference. This beam steering technique is effectuated with the use of offset parasitic elements that alter the current distribution on the driven antenna as the reactive load on the parasitic is varied. This technique, where multiple modes are generated, is a "modal antenna technique", and an antenna configured to alter radiating modes in this fashion has been referred to as a "modal antenna". This antenna architecture solves the problem associated with a lack of volume in mobile devices to accommodate antenna arrays needed to implement more traditional beam steering hardware.

While the original design and implementations for modal antennas was focused toward internal or embedded antenna designs to provide an antenna system capable of implementing a beam steering function in a small form factor mobile device, such as a cell phone or laptop, this modal antenna technique can now be implemented in access points and client devices in WLAN systems and used to improve communication link performance for these networks. On the access point side of the link, when multi-user operation is required, the capability of optimizing the radiation pattern of the antennas in the access point will be an important factor for optimizing link performance. Compared to a passive antenna used with an access point, the modal antenna can provide improved antenna gain performance in the direction of multiple clients. The small volume of the total modal antenna structure makes for easy integration in devices making a MIMO implementation feasible in a small form factor.

SUMMARY

The following disclosure concerns an antenna system comprised of multiple modal antennas in an external configuration each providing a beam steering capability applicable to a wide variety of communication systems such as access points, video streaming devices, and routers. Implementation of this antenna system will result in a reduction in the number of external antenna assemblies required, an increase in the number of available radiation patterns or modes, and the capability to dynamically optimize a multi-external antenna system for specific environments. This novel communication system optimizes the antenna system for SISO, MIMO, and beam forming systems. Use of this new technique can result in increased communication range due to an ability to dynamically change the direction of peak gain of the antenna. An increase in throughput is realized due to an increased signal to interference plus noise ratio (SINR) resulting from an optimized antenna.

DETAILED DESCRIPTION OF THE PREFERRED EMBODIMENTS

Figure 1A:
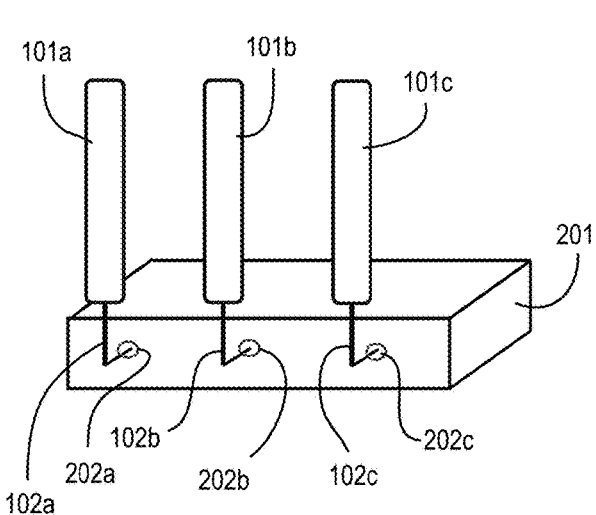
FIG. 1A shows a wireless local area network (WLAN) access point having a plurality of external modal antenna assemblies, each

A beam steering antenna system and methodology in an external configuration for is described for use in communication systems. The techniques disclosed herein provide additional antenna radiation patterns or modes compared to traditional external passive antennas, and more importantly provides the capability of dynamically adjusting the antenna system for optimal performance in terms of optimizing the antenna radiation patterns for the specific multi-path environment. Multiple beam steering antenna systems can be integrated into a single external cover and the multiple beam steering antenna systems in a single cover can be designed to cover different frequency bands. An algorithm is implemented in a processor to control antenna system beam state functionality, with the processor and algorithm residing at the antenna structure embedded in the external cover. The technique can be synchronized with digital beam forming or other Baseband initiated routines used to improve antenna system performance when multiple antennas are grouped or arrayed to provide a more directive radiation pattern for individual or groups of clients. The beam steering antenna technique will in effect improve the gain characteristics for each antenna in the system with this improvement applicable to MIMO operation as well as digital beam forming operation.

In one embodiment of this invention, two beam steering antenna systems are integrated into a single external cover or radome. The beam steering antennas operate at the same frequency band. The beam steering antennas can be aligned in a linear fashion with coaxial transmission lines and digital control lines routing to a common connection location. This single external cover containing two beam steering antennas can replace a two external cover configuration containing two passive antennas. Additionally the two beam steering antennas, where each beam steering antenna is capable of generating N radiation modes, can generate 2×N modes compared to the single passive radiation mode from the two passive antennas. When integrated with an algorithm the optimal radiation mode can be selected for each antenna to improve communication link performance, with the algorithm using a metric from the baseband processor to implement a sampling routine to determine optimal mode selection.

In another embodiment of this invention a single external cover can contain three or more beam steering antennas which can be used to replace three or more external covers with passive antennas.

In another embodiment of this invention a single external cover can contain a 2.4 GHz beam steering antenna and a 5 GHz beam steering antenna to provide dual frequency capability where multiple radiation modes can be generated at both frequency bands.

In yet another embodiment of this invention a single external cover can contain two beam steering antennas with these two beam steering antennas operating at the same frequency band. A second external cover is positioned in the vicinity of the first external cover, with this second external cover containing two parasitic elements with multi-port switch. The two parasitic elements are predominantly linear and separated by a small gap. The switch is configured to connect or disconnect the two parasitic elements to provide a capability of dynamically connecting or disconnecting the parasitic elements. Altering the length of the parasitic element in the second external cover will alter the radiation patterns from the beam steering antennas in the first external cover when the parasitic element is coupled sufficiently to the beam steering antennas and/or positioned in an optimal location to reflect the radiated signal from the antenna.

In another embodiment of this invention more than two parasitic elements can be positioned in an external cover previously described along with two or more switches configured to connect or disconnect the multiple parasitic elements. With this second external cover positioned in the vicinity of a first external cover containing multiple beam steering antennas parasitic elements can be aligned with each beam steering antenna in the first external cover and used to alter the radiation patterns.

In another embodiment of this invention more than two parasitic elements can be positioned in an external cover termed the second external cover previously described along with two or more switches configured to connect or disconnect the multiple parasitic elements. A first and third external cover can be positioned in the vicinity of this second external cover with the first and third external covers containing one or multiple beam steering antennas. Parasitic elements in the second external cover can be aligned with one or multiple beam steering antennas in the first and third external covers and used to alter the radiation patterns. The parasitic elements can also be adjusted to alter isolation and/or envelope correlation between pairs of beam steering antennas and the modes generated from said antennas.

In another embodiment of this invention a method of determining angle rotation can be implemented at the connection where the external cover containing one or multiple beam steering antennas connects to the access point or communication device. This device or method to discern angle of rotation can be used to determine position and orientation of the external cover, with this information used in the algorithm controlling the beam steering antenna to converge to an optimal mode selection more quickly. Measurements during antenna system development can be used to designate beam steering antenna modes that will fail to meet system level requirements such as isolation, and these modes can be eliminated from potential selection for specific range of angles.

In all of the previously described embodiments an algorithm can be implemented with the beam steering antennas to survey a metric from the baseband processor and select the optimal radiation mode of each beam steering antenna in the external covers. The algorithm will select the mode that works best for the propagation channel, and with a low latency metric from baseband this dynamic mode selection can take into account positioning of the external covers. As an access point is positioned in different rooms or locations within a room the external antennas can be angled or positioned to accommodate a specific volume allocated for the access point. Alternately, with the beam steering antennas and algorithm providing dynamic selection and optimization of radiation modes, an access point design can be implemented where the external covers are fixed. By fixing the external covers to the access point such that they cannot be rotated or moved the likelihood of degrading antenna system performance by reducing antenna to antenna isolation or envelope correlation can be eliminated.

Now turning to the drawings, FIGS. 1(A-C) illustrate a wireless local area network (WLAN) access point 201 where three external enclosures 101a; 101b; and 101c are implemented. The access point 201 includes a plurality of connection points 202a; 202b; and 202c, wherein the external enclosures are connected to the access point at the connection points via transmission lines 102a; 102b; and 102c, therebetween.

Figure 1B:
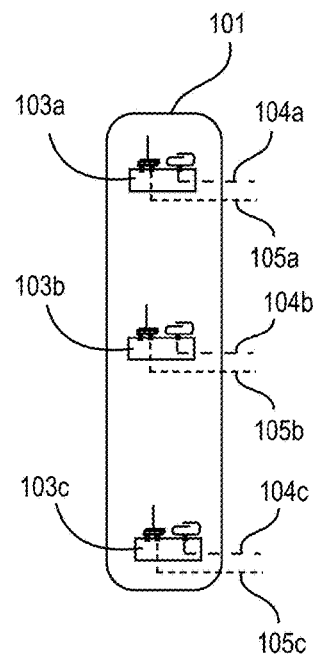
FIG. 1B shows one modal antenna assembly including a plurality of modal antennas, wherein each of the modal antennas is configurable in one of a plurality of possible antenna modes.

In each external enclosure 101 are three modal antennas 103a; 103b; and 103c, as shown in FIG. 1B. The modal antennas are each capable of generating a plurality of radiation pattern modes, wherein the modal antenna is configurable in one of the plurality of modes, and the antenna is configured with a distinct radiation pattern when configured in each of the plurality of modes. The modal antennas 103(a-c) receive RF signals 104(a-c) and control signals 105(a-c) from the transceiver and circuitry to communicate with the network.

Figure 1C:
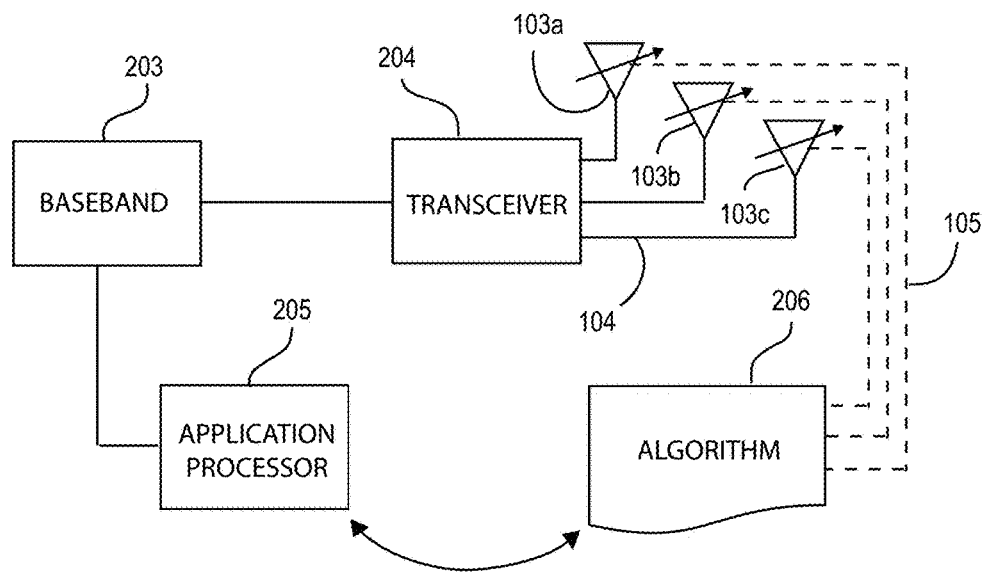
FIG. 1C shows a modal antenna system configured to receive an RF signal and a signal metric from baseband, the RF signal is communicated through a transceiver and a plurality of modal antennas, whereas the signal metric is sampled by an application processor wherein an algorithm is implemented to determine a mode of the modal antennas and control signals are sent for configuring the modal antennas in the respective modes.

A block diagram is shown in FIG. 1C where a transceiver 204 is connected to the three modal antennas 103(a-c), respectively. A baseband unit 203 and application processor 205 are shown and an algorithm 206 is integrated into the application processor, with this algorithm used to control the beam selection of the modal antennas. Here, baseband provides an RF signal to the transceiver and antennas, whereas the application processor is configured to receive a signal metric, such as a channel quality indicator (CQI), for processing with the algorithm to determine an optimal mode for each of the antennas. Upon determining the optimal mode, control signals are sent via transmission lines 105 to the modal antennas, wherein an RF integrated circuit is used to configure the modal antenna in the selected mode.

Figure 2:
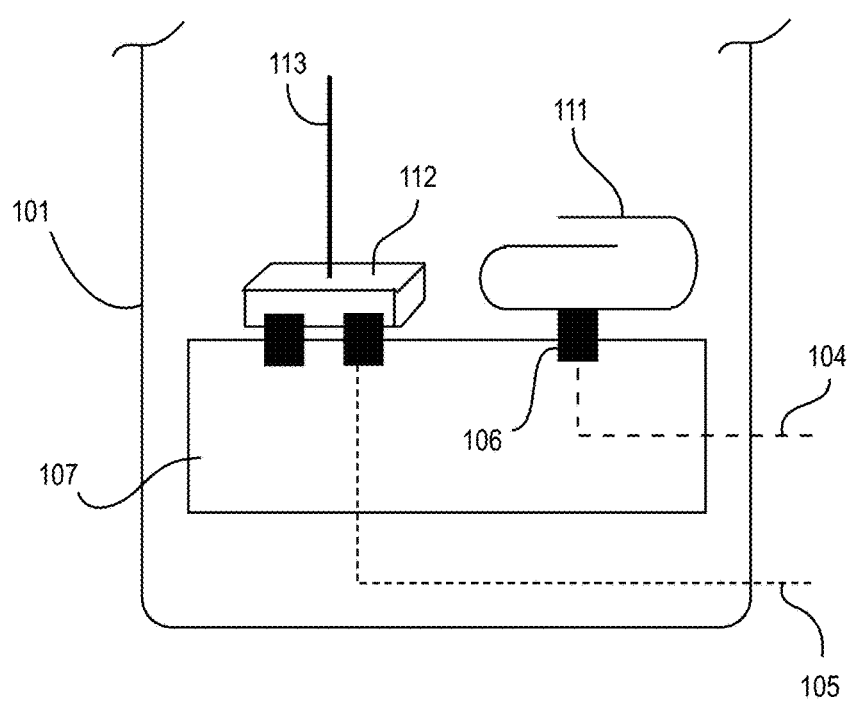
FIG. 2 shows an example internal configuration which is implemented in each of the external antenna assemblies; including, for each modal antenna therein, an antenna element, a parasitic element coupled to an RF integrated circuit (RFIC), and RF and digital control lines.

FIG. 2 illustrates the components used to configure a modal or beam steering antenna that is used to populate the external enclosure 101. An antenna element 111, parasitic element 113, reference ground 107, RFIC 112, and RF and digital control lines 104 and 105, respectively, are shown.

Figure 3A:
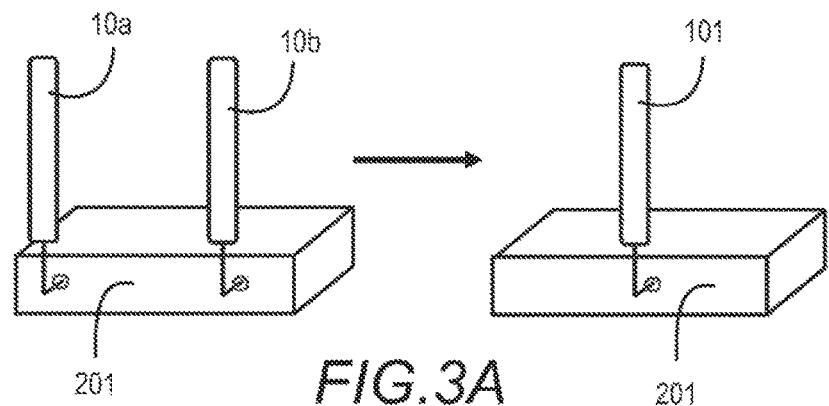
FIG. 3A illustrates an access point with a single external enclosure containing two beam steering antennas can be used to replace two external enclosures which contain passive antennas.

FIG. 3A illustrates the concept where an access point 201 with a single external enclosure 101 containing two beam steering antennas can be used to replace an access point 201 with two external enclosures 10a; 10b which contain passive antennas.

Figure 3B:
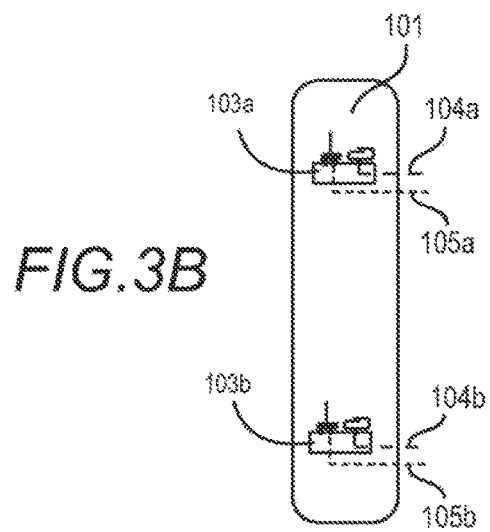
FIG. 3B shows an external antenna module having a first modal antenna and a second modal antenna within an enclosure.

FIG. 3B shows an external antenna module 101 having a first modal antenna 103a and a second modal antenna 103b within an enclosure 101. The modal antennas each receive RF signals through a corresponding RF transmission line 104a; 104b, and control signals from corresponding control transmission lines 105a; 105b.

Figure 3C:
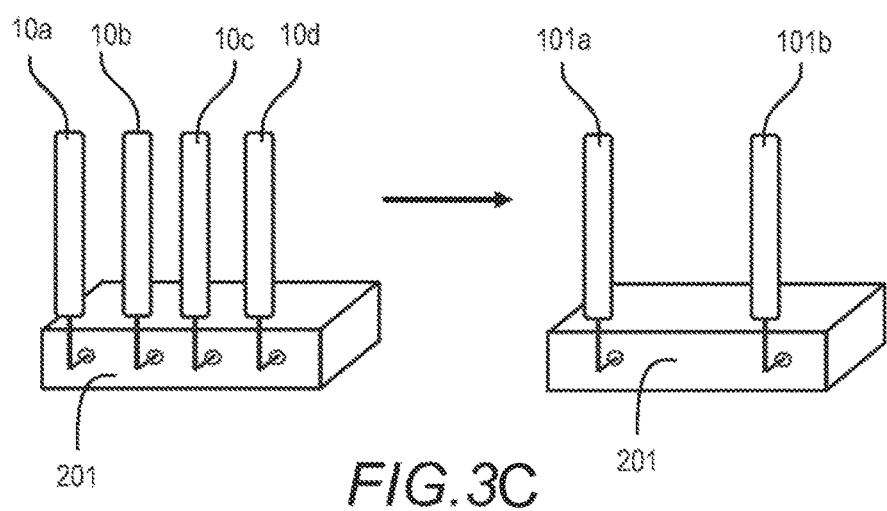
FIG. 3C illustrates an access point with two external antenna modules containing modal antennas can be used to replace an access point with four passive antennas.

FIG. 3C illustrates an access point 201 with two external antenna modules 101a; 101b containing modal antennas can be used to replace an access point 201 with four passive antennas 10a; 10b; 10c; and 10d.

Figure 4A:
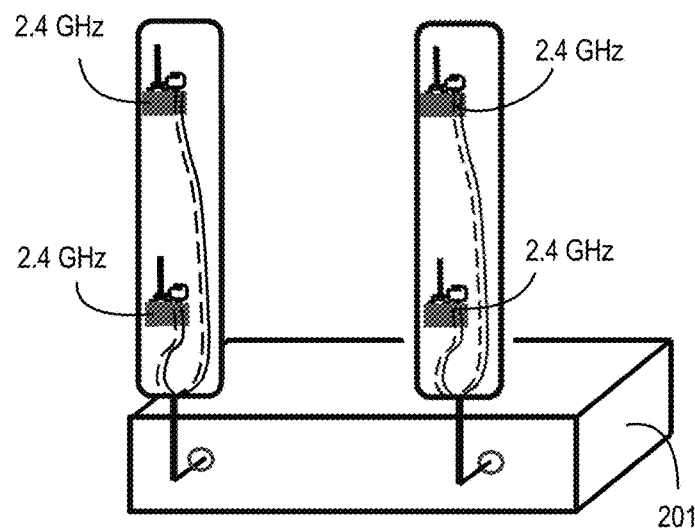
FIG. 4A illustrates modal beam steering antennas in the enclosures connected to an access point can be operating at the same frequency, here 2.4 GHz.

FIG. 4A shows an access point 201 with external antenna modules, where all beam steering antennas in the external antenna modules are connected to an access point can be operating at the same frequency, here 2.4 GHz.

Figure 4B:
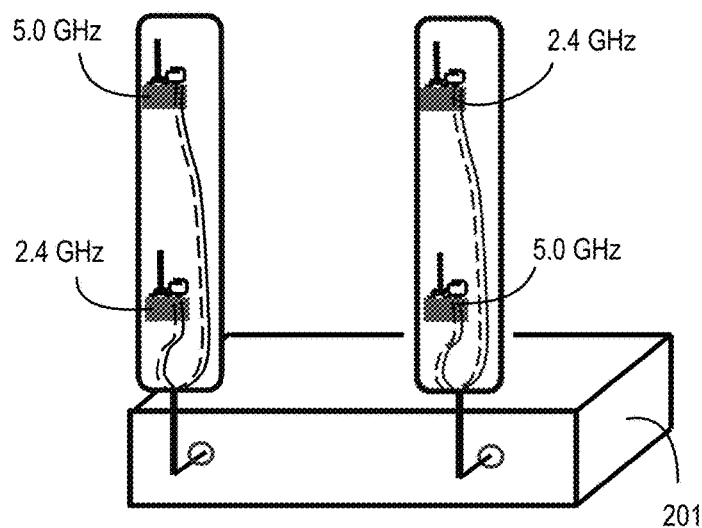
FIG. 4B shows modal beam steering antennas integrated in the external enclosures can operate at two frequency bands, for example 2.4 GHz and 5.0 GHz, with some beam steering antennas dedicated to each frequency band.

FIG. 4B shows an access point 201 with the beam steering antennas integrated in the external enclosures configured to operate at two frequency bands, here 2. GHz and 5.0 GHz, with some beam steering antennas dedicated to each frequency band.

Figure 5:
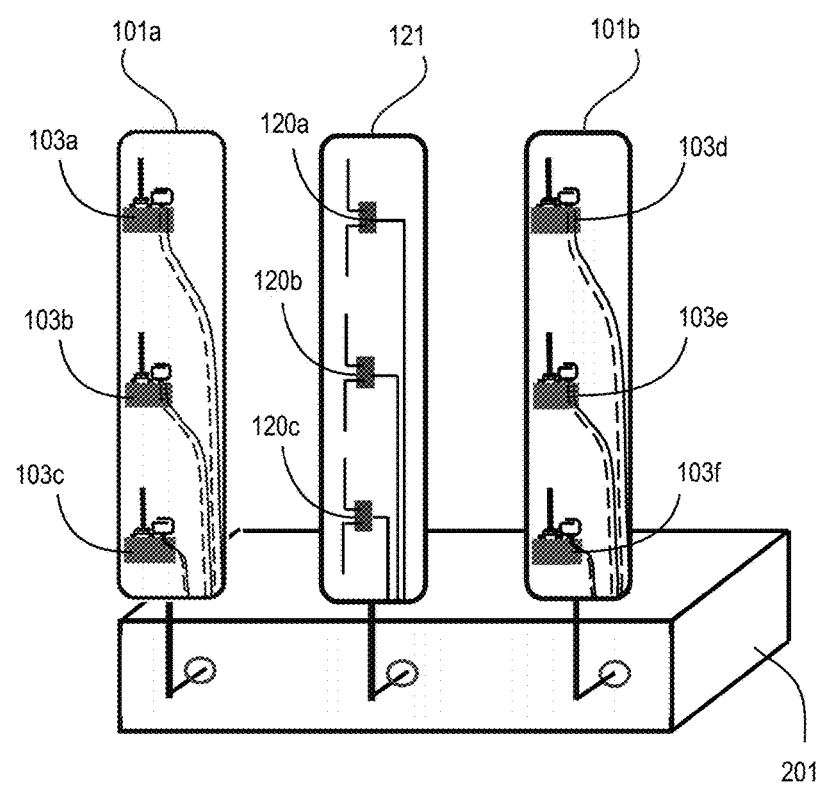
FIG. 5 illustrates a configuration where two external enclosures containing modal beam steering antennas are positioned external to an access point or other communication device, and a parasitic assembly containing additional parasitic elements is positioned between the two external enclosures containing modal beam steering antennas.

FIG. 5 illustrates a configuration where two external enclosures 101a; 101b containing beam steering antennas 103(a-f) are positioned external to an access point 201 or other communication device. A third external enclosure, termed a "parasitic element assembly 121", is positioned between the first two external enclosures 101a; 101b, with the parasitic element assembly containing multiple parasitic elements 120a; 120b; and 120c. Switches are positioned between the parasitic elements to provide the capability to connect or disconnect the individual elements.

Figure 6:
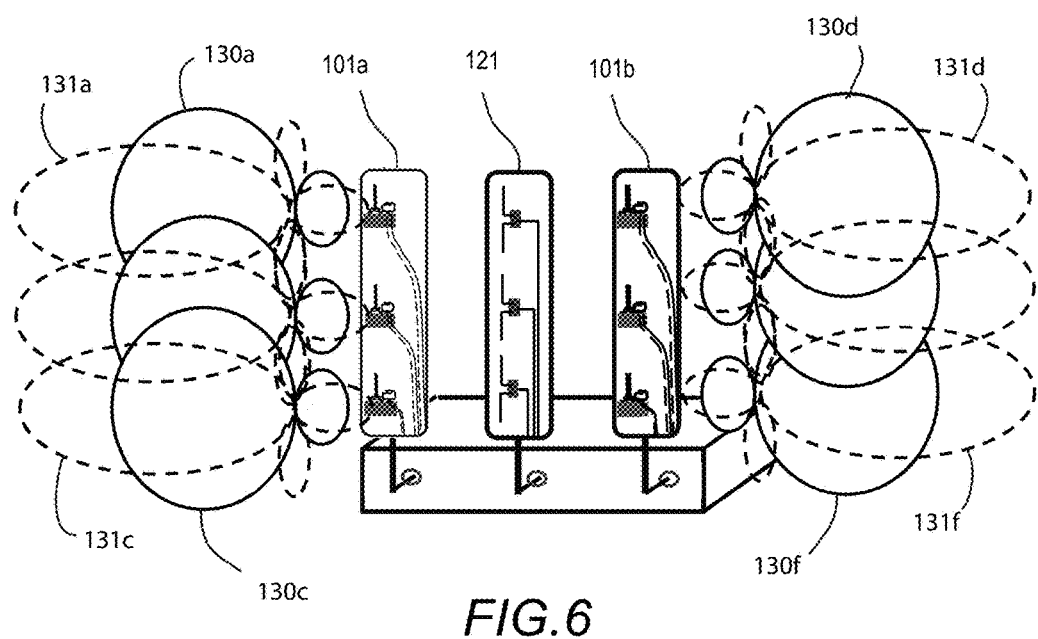
FIG. 6 illustrates the concept of changing the shape of the radiation patterns of the beam steering antennas by connecting or disconnecting the parasitic elements in the parasitic assembly positioned therebetween.

FIG. 6 illustrates an access point configured to change the shape of the radiation patterns of the beam steering antennas by connecting or disconnecting the parasitic elements of the parasitic element assembly disposed therebetween. The parasitic element assembly 121 provides additional degrees of optimization of antenna modes associated with the modal beam steering antennas in modules 101a and 101b. The modal beam steering antennas, and parasitic elements, are configured to provide a plurality of possible antenna modes. In addition, isolation can be altered between modules 101a and 101b using the parasitic element assembly. Radiation patterns 130(a-f); and 131(a-f) associated with various modes of the modal beam steering antennas are shown.

Figure 7A:
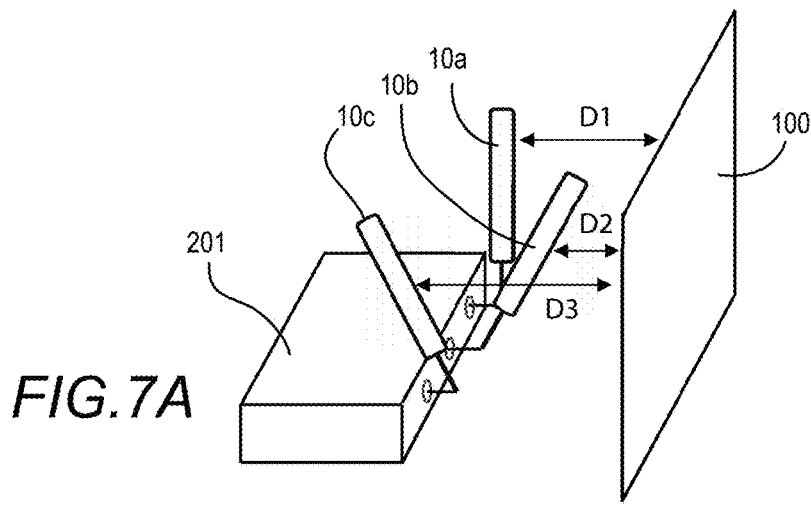
FIG. 7A illustrates an access point with three external enclosures each containing a single passive antenna.

FIG. 7A illustrates an access point 201 with three external enclosures 10(a-c) that contain a single passive antenna each. A wall or obstruction 100 is shown in the vicinity of the access point 201. Distances of separation D1; D2; and D3 are shown corresponding between each of the enclosures and the obstruction.

Figure 7B:
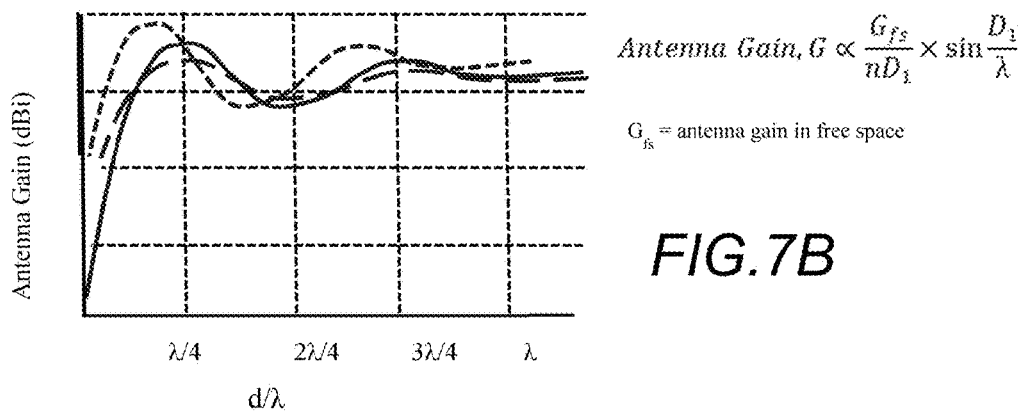
FIG. 7B shows the antenna gain for each of the three passive antennas of FIG. 7A.

An antenna gain plot as a function of wavelength separation between the antenna element and the wall or obstruction is shown in FIG. 7B. The antenna gain varies in magnitude as a function of separation distance from the obstruction.

Figure 7C:
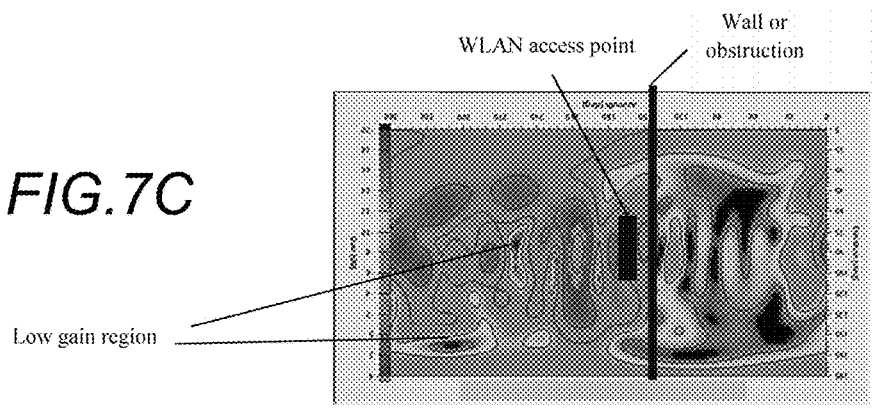
FIG. 7C shows a heat map illustrating low gain regions associated with the system of FIG. 7A.

Also shown in FIG. 7C is a composite radiation pattern displayed in two dimensions where gain as a function of azimuth and elevation angle is displayed. The location of the wall or obstruction is shown on the gain plot and low gain regions caused by interactions of the direct radiated signal and reflections off of the wall are highlighted.

Figure 8A:
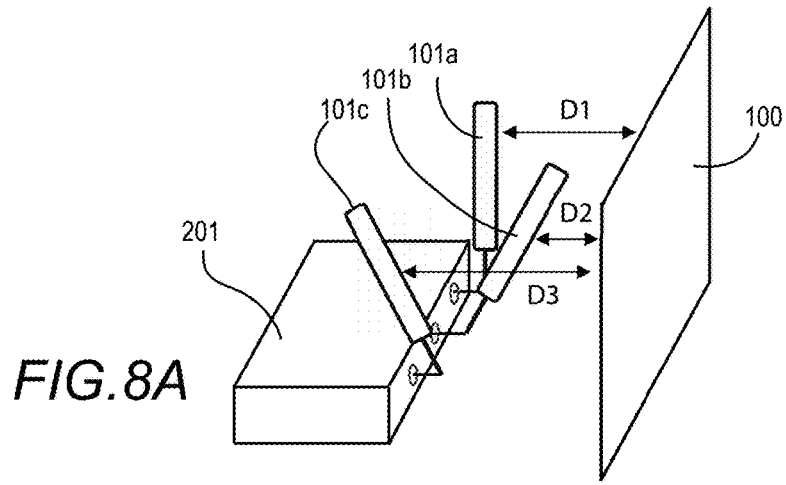
FIG. 8A illustrates an access point with three external enclosures that each contains a modal beam steering antenna.

FIG. 8A illustrates an access point 201 with three external enclosures 101(a-c) that each contain beam steering antennas. A wall or obstruction 100 is shown in the vicinity of the access point 201.

Figure 8B:
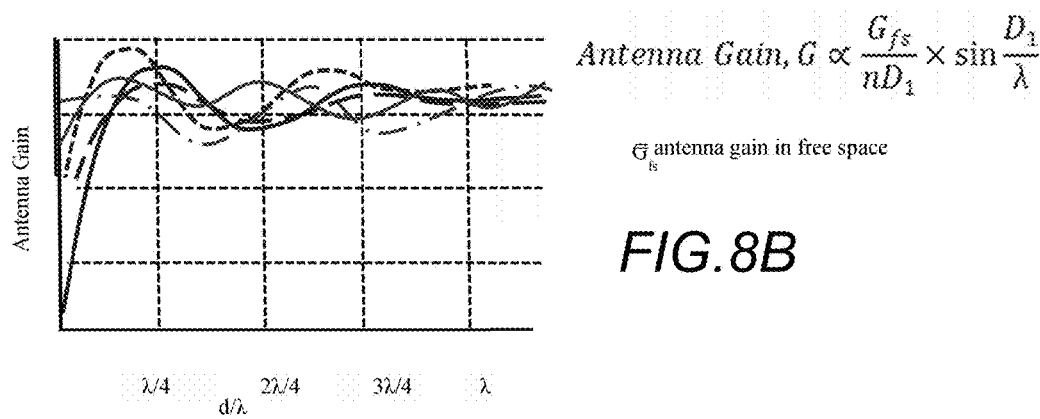
FIG. 8B shows the antenna gain for each of the three modal beam steering antennas of FIG. 8A.

An antenna gain plot as a function of wavelength separation between the antenna element and the wall or obstruction is shown in FIG. 8B. The antenna gain varies in magnitude as a function of separation distance from the obstruction.

Figure 8C:
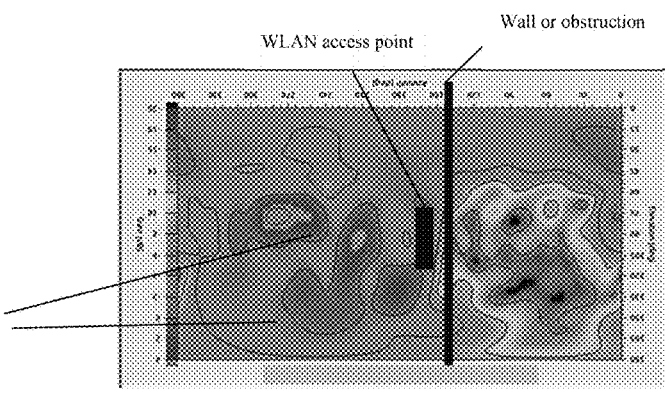
FIG. 8C shows a heat map illustrating low gain regions associated with the system of FIG. 7A are improved with the use of the beam steering modal antennas of FIG. 8A.

Also shown in FIG. 8c is a composite radiation pattern displayed in two dimensions where gain as a function of azimuth and elevation angle is displayed. The location of the wall or obstruction is shown on the gain plot and regions where low gain had been observed when passive antennas were used are shown to have higher gain due to the higher gain provided by the composite radiation pattern.

Figure 9:
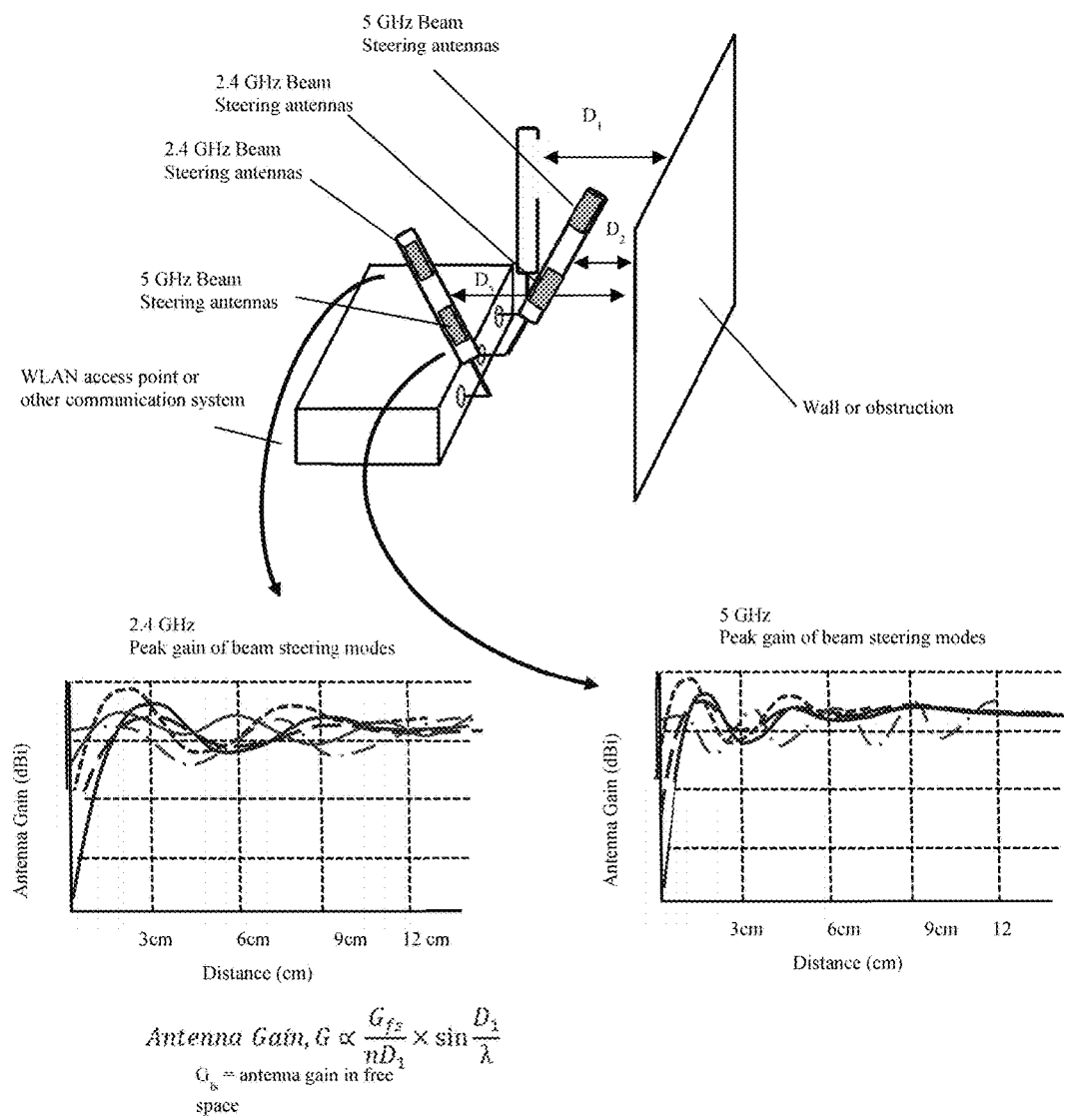
FIG. 9 illustrates an access point with three external enclosures that contain modal beam steering antennas; here it is shown that the different antennas produce different interference patterns with reflected signals from obstructions.

FIG. 9 illustrates an access point with three external enclosures that contain beam steering antennas. Beam steering antennas tuned for the 2.4 GHz and 5 GHz bands are shown. A wall or obstruction is shown in the vicinity of the access point. Two antenna gain plots are shown where gain as a function of wavelength separation between the antenna element and the wall or obstruction is shown at both 2.4 GHz and 5 GHz. The antenna gain varies in magnitude as a function of separation distance from the obstruction and varies as a function of frequency.

Figure 10:
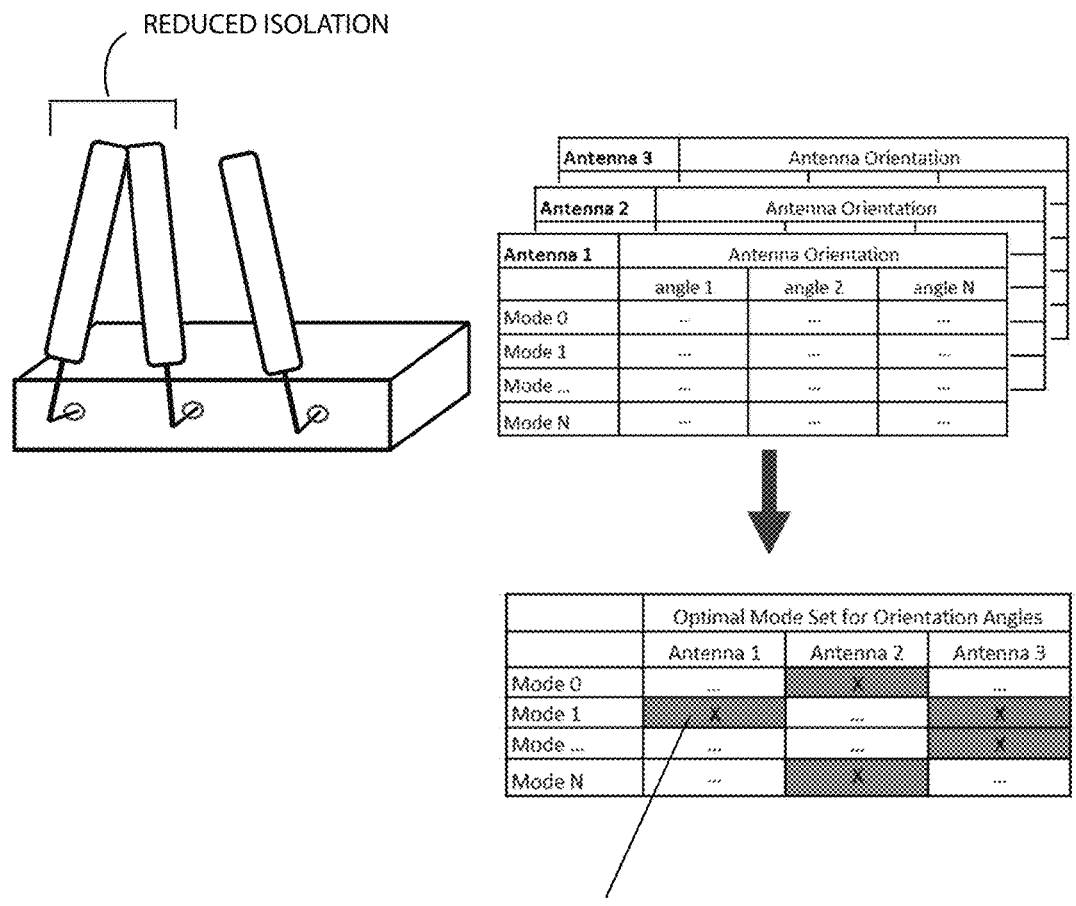
FIG. 10 illustrates an access point with three external enclosures that contain modal beam steering antennas, the beam steering antennas can improve isolation, correlation, or both, when external enclosures are misaligned.

FIG. 10 illustrates an access point with three external enclosures that contain beam steering antennas. Two of the external enclosures are rotated such that they touch which will typically decrease isolation between antennas. The beam steering antennas integrated into the external enclosures provide the capability to dynamically compensate for degraded isolation and/or correlation when external enclosures are improperly positioned.

Figure 11:
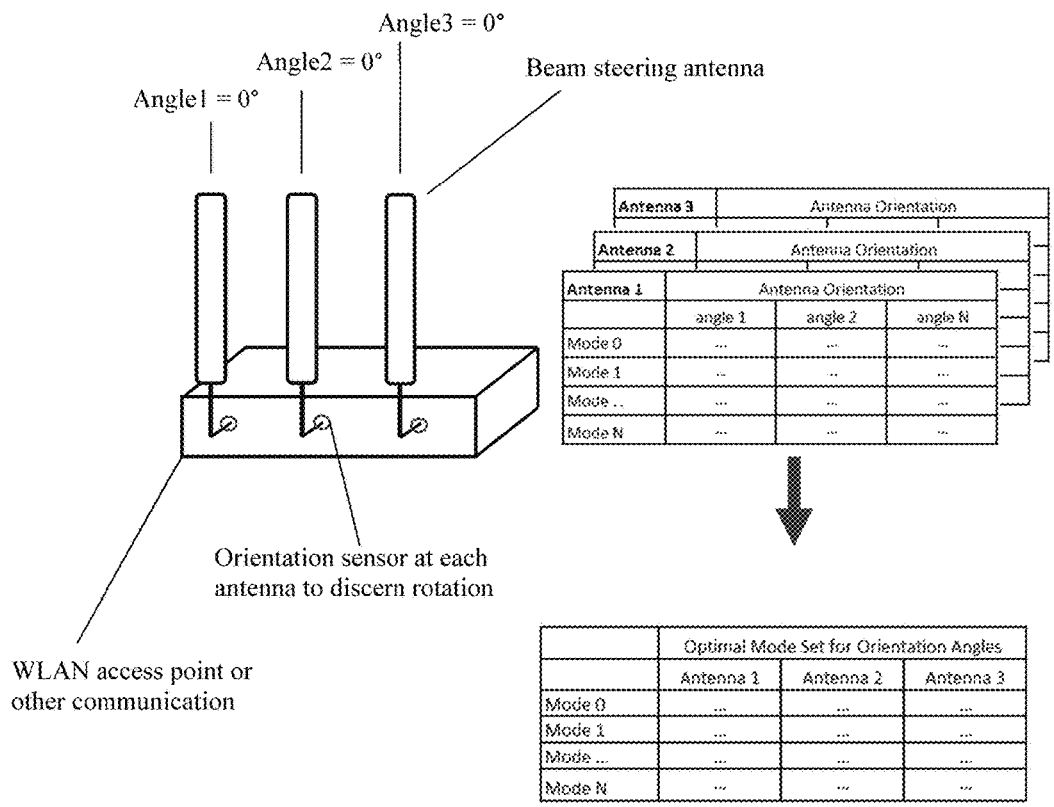
FIG. 11 illustrates the concept of integrating orientation sensors at the joint or connection where the external enclosure is attached to the access point.

FIG. 11 illustrates the concept of integrating orientation sensors at the joint or connection where the external enclosure is attached to the access point. The orientation of the external enclosures can be determined by the sensors and this information can be used to eliminate radiation modes for sampling by the algorithm based on prior measurements and characterization.

Figure 12:
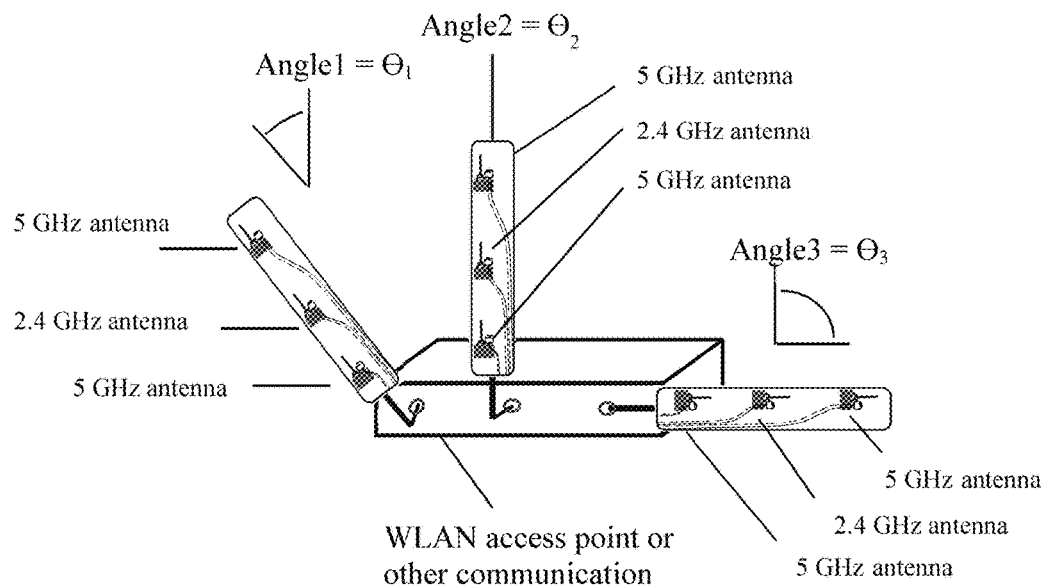
FIG. 12 illustrates an access point with three external enclosures that each contain modal beam steering antennas; the frequency band for operation, as well as antenna mode selection, can be chosen based on network load balancing.

FIG. 12 illustrates an access point with three external enclosures that contain beam steering antennas. Beam steering antennas at two frequency bands are integrated into the external enclosures. For WLAN applications at 2.4 and 5 GHz the frequency band of operation as well as radiation mode selection can be chosen based on network load balancing.

Figure 13:
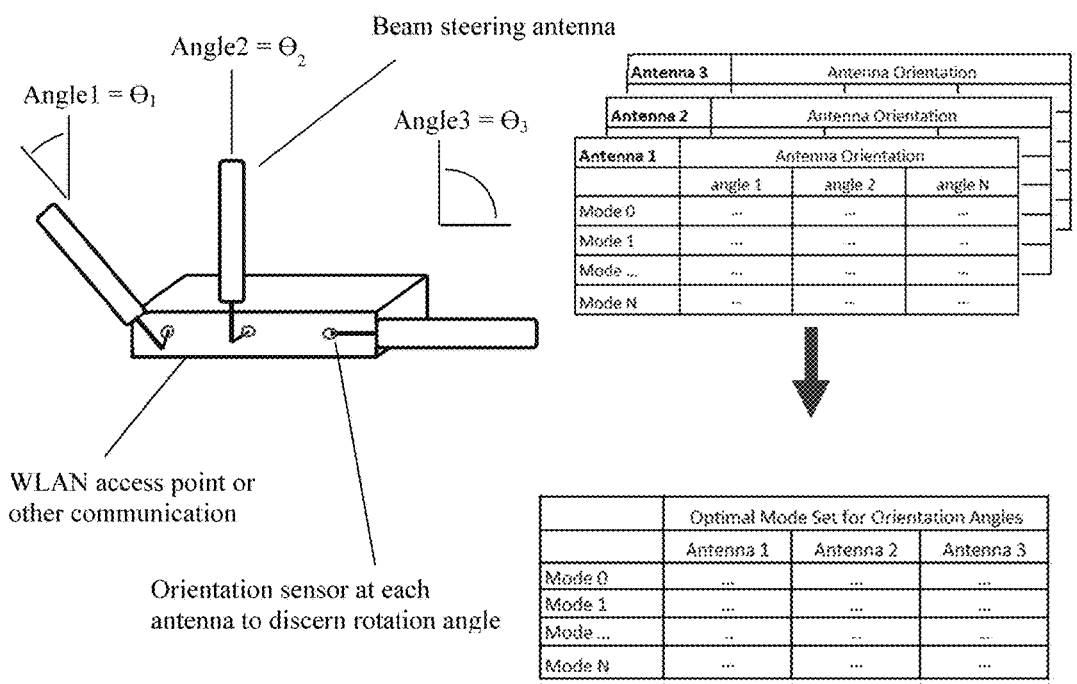
FIG. 13 illustrates the concept of integrating orientation sensors at the joint or connection where the external enclosure is attached to the access point, and associating an optimal antenna mode for each modal beam steering antenna based on angle of orientation of the external enclosures.

FIG. 13 illustrates the concept of integrating orientation sensors at the joint or connection where the external enclosure is attached to the access point. The orientation of the external enclosures can be determined by the sensors and this information can be used to eliminate radiation modes for sampling by the algorithm based on prior measurements and characterization.

Figure 14:
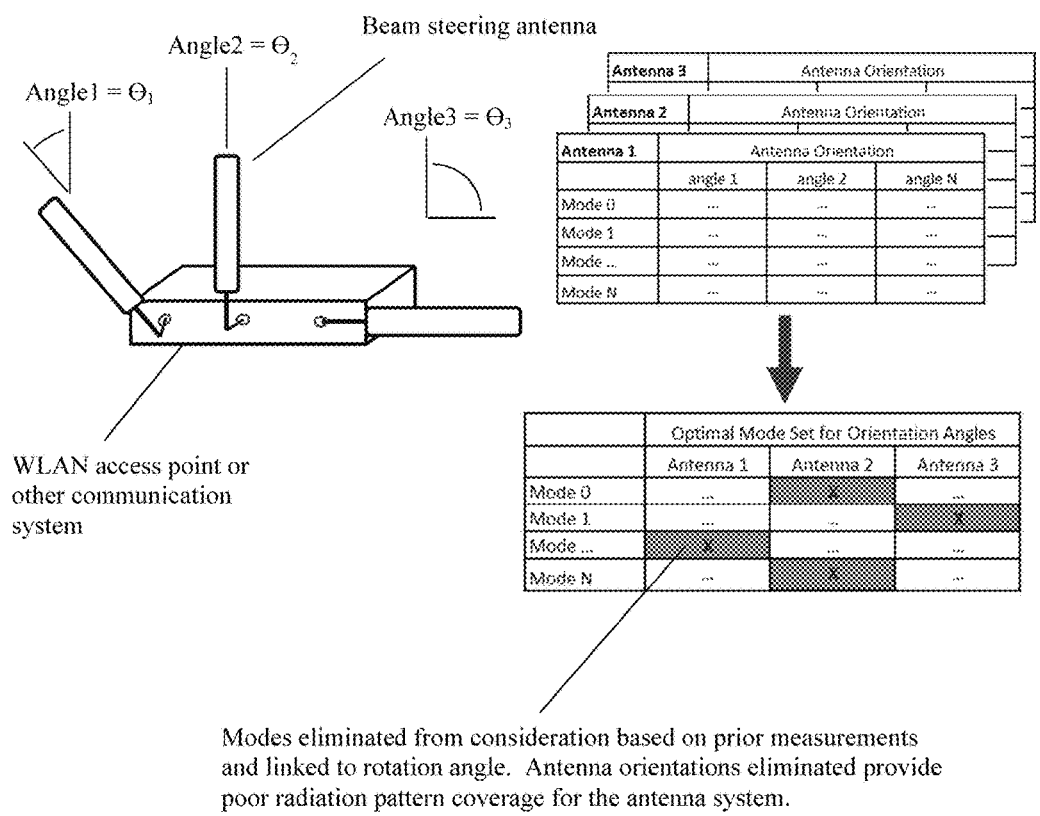
FIG. 14 illustrates the process of the algorithm controlling the modal beam steering antenna system and sampling the modes for specific external enclosure configurations.

FIG. 14 illustrates the process of the algorithm controlling the beam steering antenna system and sampling the modes for specific external enclosure configurations. For a specific enclosure configuration the modes are sampled and a set of optimal modes are determined and used by the beam steering antennas to optimize the communication link. Orientation sensors are not included in this configuration.

Figure 15:
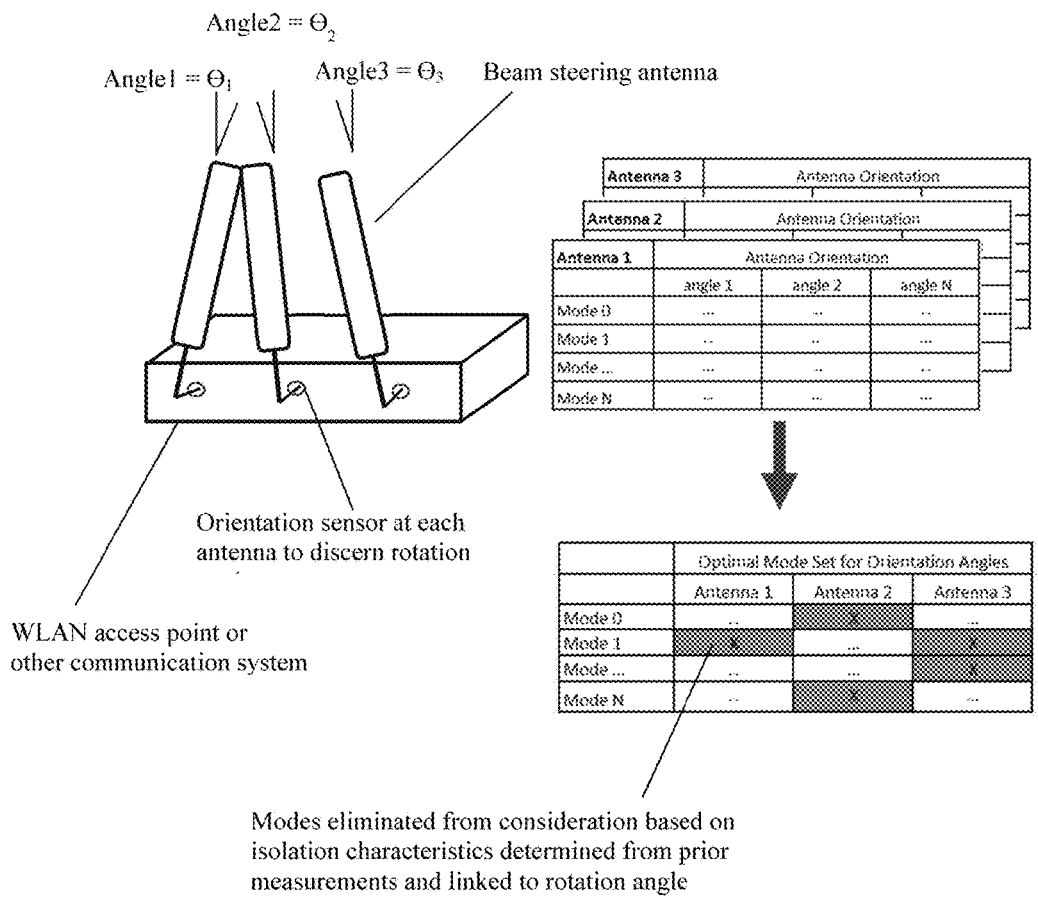
FIG. 15 illustrates an access point with three external enclosures that contain modal beam steering antennas, certain antenna modes are eliminated if poor isolation characteristics as a function of rotation angle of the enclosure.

FIG. 15 illustrates an access point with three external enclosures that contain beam steering antennas. Two of the external enclosures are rotated such that they touch which will typically decrease isolation between antennas. The beam steering antennas integrated into the external enclosures provide the capability to dynamically compensate for degraded isolation and/or correlation when external enclosures are improperly positioned. Orientation sensors associated with each external enclosure. Antenna mode set determined during development selected to populate a preferred mode table for sampling. Modes eliminated from consideration due to poor isolation characteristics as a function of rotation angle.

Thus, in certain embodiments is provided:

a communication system comprising: a predominantly RF transparent enclosure that is positioned external to a communication system wherein the enclosure can be rotated in one or multiple planes and/or extended or contracted in length, or moved to a second location in relation to the communication system; the communication system is configured with a baseband unit and a transceiver, with said transceiver containing one or multiple transmit/receive ports; internal to the predominantly RF transparent enclosure is one or multiple antennas wherein each antenna is a modal antenna with said modal antenna capable of generating multiple radiation patterns, with the radiation patterns referred to as radiation modes, and with each radiation mode being different from the other radiation modes; each modal antenna is connected to the transceiver, with one antenna connected to each transmit/receive port; a processor containing an algorithm; the algorithm resident in the processor is configured to survey one or multiple metrics from the baseband unit and uses the one or multiple metrics to select the radiation mode of the modal antenna for a preferred communication link characteristic between the communication system and other devices, as the external enclosure is moved, rotated, or re-positioned the algorithm selects the optimal mode for the modal antennas in the enclosure.

In some embodiments, a second predominantly RF transparent enclosure is positioned external to a communication system, with this second external enclosure positioned in the vicinity of the first external enclosure, internal to this second predominantly RF transparent enclosure is one or multiple antennas wherein each antenna is a modal antenna with said modal antenna capable of generating multiple radiation patterns, with the radiation patterns referred to as radiation modes, and with each radiation mode being different from the other radiation modes; each modal antenna in this second external enclosure is connected to the transceiver, with one antenna connected to each transmit/receive port, the algorithm is used to select optimal mode selection for all modal antennas in the two external enclosures.

In some embodiments, three or more predominantly RF transparent enclosures are positioned external to a communication system, with these three or more external enclosures positioned in the vicinity of the first and second external enclosures, internal to these three or more predominantly RF transparent enclosures are one or multiple antennas wherein each antenna is a modal antenna with said modal antenna capable of generating multiple radiation patterns, with the radiation patterns referred to as radiation modes, and with each radiation mode being different from the other radiation modes; each modal antenna in these three or more external enclosures is connected to the transceiver, with one antenna connected to each transmit/receive port, the algorithm is used to select optimal mode selection for all modal antennas in the three or more external enclosures.

In some embodiments, one or more of the antennas in the predominantly RF transparent enclosure is not a modal antenna.

In some embodiments, when more than one antenna is present the two or more antennas are operating at the same frequency band.

In some embodiments, when more than one antenna is present the two or more antennas are operating at two or more frequency bands with at least one antenna operating at a first frequency band and at least one antenna operating at a second frequency band.

In some embodiments, the predominantly RF external enclosures are fixed in position.

In some embodiments, a third predominantly RF transparent enclosure is positioned between the first and second enclosures, this third external enclosure is positioned in the vicinity of the first and second external enclosure, with this third external enclosure containing two conductors and a switch, the two conductors are predominantly linear and separated by a small gap, the switch is configured to connect or disconnect the two conductors to provide a capability of dynamically connecting or disconnecting the conductors, altering the length of the conductors in the third external enclosure will alter the radiation patterns from the modal antennas in the first and second external enclosures when the conductors are coupled sufficiently to the modal antennas and/or positioned in an optimal location to reflect the radiated signal from the antenna.

In some embodiments, more than two conductors are integrated internal to the external enclosure, two or more switches are used to provide a capability to connect and/or disconnect the conductors. In other embodiments, one or multiple conductors are not predominantly linear in extent.

In some embodiments, one or multiple antennas are operating at a first frequency band and one or more antennas are operating at a second frequency band.

In some embodiments, an initialization routine is implemented by the end user of the communication system where a communication link is established between the communication system and a second communication device; the communication system is positioned within the region, room, building, home, or outdoor location that the system is intended to operate in; the second communication device is positioned at a location within the region that communication is desired or required; for an initial orientation or position of the external enclosure or enclosures the communication link is established and a metric which provides an indication of communication link quality is measured and denoted; a second and multiple external enclosure orientations and/or positions are next implemented and the link metric is measured and denoted; the second communication device can be moved to additional locations where communication is desired and the measurement process repeated where communication link metrics are recorded for multiple external enclosure orientations and/or positions; the communication link metrics per external enclosure orientation or positions is reviewed and the optimal orientations or positions are chosen for the external enclosures to optimize communication link performance.

In some embodiments, a method of discerning rotation angle of the joint or connection that attaches the predominantly RF transparent enclosure to the communication device; the rotation angle from this method is used to designate radiation modes to check to determine optimal communication system performance and to designate radiation modes to ignore based on prior measurements or analysis.

In some embodiments, a feature is implemented in the algorithm to monitor communication link performance between the communication system and a communication device or devices to determine which frequency band provides the better communication link performance.

What is claimed is:

1. A wireless communication device, comprising:
    at least one external antenna module;
    the external antenna module comprising two or more multi-mode antennas enclosed therein;
    each multi-mode antennas comprising:
    a radiating antenna element,
    a parasitic element positioned adjacent to the radiating antenna element,
    a radio frequency (RF) integrated circuit coupled to the parasitic element,
    a reference ground, wherein each of the radiating antenna element and the parasitic element are coupled to the reference ground,
    an RF transmission line coupled to the radiating antenna element and configured to receive RF signals from a transceiver, and
    a control transmission line coupled to the RF integrated circuit and configured to receive control signals from an application processor;
    wherein the application processor is configured to sample a signal metric and to determine a selected mode from a set of modes for configuring each of the multi-mode antennas of the external antenna module, wherein each mode in the set of modes is associated with a different radiation pattern for the multi-mode antenna;
    wherein the application processor is configured to eliminate at least one mode of the set of modes in determining the selected mode based at least in part on an orientation of the external antenna module, wherein the at least one mode is eliminated by removing the at least one mode from the set of modes that are considered in determining the selected mode.

2. The device of claim 1, wherein the selected mode is selected to be a one with a best signal quality based on the signal metric sampled.

3. The device of claim 1, wherein the signal metric comprises a channel quality indicator (CQI).

4. The device of claim 1, wherein the wireless communication device comprises a WIFI access point.

5. The device of claim 4, the multi-mode antennas configured with resonances at 2.4 GHz.

6. The device of claim 4, a first of the multi-mode antennas configured with resonances at 2.4 GHz, and a second of the multi-mode antennas configured at 5.0 GHz.

7. The device of claim 1, the external antenna module comprising three multi-mode antennas enclosed therein.

8. The device of claim 1, comprising two external antenna modules.

9. The device of claim 8, further comprising a parasitic element assembly disposed between each of the two external antenna modules, the parasitic element assembly configured to induce a radiation pattern change on the multi-mode antennas of each of the two external antenna modules.

10. The device of claim 9, wherein the parasitic element assembly comprises the parasitic element coupled to a switch, wherein the switch is configured to connect or disconnect the parasitic element.

11. The device of claim 10, wherein the parasitic element assembly comprises two parasitic elements coupled to the switch.

12. The device of claim 10, wherein the parasitic element assembly comprises two or more switches, each of the switches coupled to one or more parasitic elements.

13. The device of claim 1, wherein the selected mode of each of the multi-mode antennas in the external antenna module is selected based on the orientation of the external antenna module.

14. The device of claim 13, wherein the wireless communication device further comprises an orientation sensor coupled to the external antenna module.

* * * * *